United States Patent
Zhao et al.

(10) Patent No.: US 10,684,906 B2
(45) Date of Patent: Jun. 16, 2020

(54) MONITORING PERIPHERAL TRANSACTIONS

(71) Applicant: Microsoft Technology Licensing, LLC, Redmond, WA (US)

(72) Inventors: Pengxiang Zhao, Bellevue, WA (US); Bin Wang, Bellevue, WA (US); Dejun Zhang, Bellevue, WA (US); Wei Huang, Redmond, WA (US); Robert Zhu, Bellevue, WA (US); Xuejun Chen, Redmond, WA (US); Ying N. Chin, Bellevue, WA (US); Satyendra Bahadur, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 15/183,613

(22) Filed: Jun. 15, 2016

(65) Prior Publication Data

US 2017/0364401 A1    Dec. 21, 2017

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0742* (2013.01); *G06F 11/0748* (2013.01);
(Continued)

(58) Field of Classification Search
CPC . G06F 11/079; G06F 11/0748; G06F 11/0751
See application file for complete search history.

(56) References Cited

U.S. PATENT DOCUMENTS

| 5,964,892 A | 10/1999 | Tang et al. |
| 6,085,265 A * | 7/2000 | Kou ............ G06F 13/102 370/276 |

(Continued)

FOREIGN PATENT DOCUMENTS

| EP | 2136310 A1 | 12/2009 |
| JP | 2001308891 A | 11/2001 |

OTHER PUBLICATIONS

"USB in Windows—FAQ", Published on: Oct. 25, 2013 Available at: https://msdn.microsoft.com/en-us/library/windows/hardware/dn423379(v=vs.85).aspx.
(Continued)

*Primary Examiner* — Katherine Lin
(74) *Attorney, Agent, or Firm* — Newport IP, LLC; David W. Foster

(57) ABSTRACT

A communications link between a computing device and an external device is monitored. A driver for the communications link is executed on the computing device. The driver is configured to monitor data traffic over the communications link. Data indicative of the monitored data traffic is received from the driver. The data is sent to an analysis function configured to identify a condition of the communications link based on accumulated data indicative of the data traffic. Data indicative of an identified condition of the communications link is received from the analytics function. An indication of the identified condition is rendered on a display device of the computing device.

19 Claims, 12 Drawing Sheets

(51) Int. Cl.
   *G06F 11/30* (2006.01)
   *G06F 11/34* (2006.01)
   *G06F 13/10* (2006.01)
   *G06F 13/42* (2006.01)
(52) U.S. Cl.
   CPC ...... *G06F 11/0751* (2013.01); *G06F 11/3013* (2013.01); *G06F 11/349* (2013.01); *G06F 13/102* (2013.01); *G06F 13/4286* (2013.01); *G06F 2213/0042* (2013.01)

(56) References Cited

U.S. PATENT DOCUMENTS

| | | | |
|---|---|---|---|
| 6,311,294 B1 * | 10/2001 | Larky | G06F 13/24 710/33 |
| 6,990,550 B2 | 1/2006 | Hesse et al. | |
| 7,149,839 B2 | 12/2006 | Aull et al. | |
| 7,257,736 B2 | 8/2007 | Dunn et al. | |
| 7,302,614 B2 | 11/2007 | Goto | |
| 7,493,422 B2 | 2/2009 | Farquhar | |
| 7,802,022 B2 | 9/2010 | Bhesania et al. | |
| 8,176,216 B1 | 5/2012 | Santhanam et al. | |
| 8,200,853 B2 | 6/2012 | Aull et al. | |
| 8,443,222 B1 | 5/2013 | Niimura | |
| 8,452,910 B1 | 5/2013 | Bruhis et al. | |
| 8,527,670 B2 | 9/2013 | Jiang et al. | |
| 8,850,090 B2 | 9/2014 | De Goede | |
| 2003/0061510 A1 * | 3/2003 | Hartmann | H04L 63/04 726/23 |
| 2003/0143956 A1 * | 7/2003 | Taylor | H04W 52/50 455/67.11 |
| 2003/0229827 A1 | 12/2003 | Dun et al. | |
| 2006/0218409 A1 * | 9/2006 | Avraham | G06F 13/102 713/189 |
| 2008/0104285 A1 * | 5/2008 | Xiong | G06F 11/3041 710/15 |
| 2010/0313059 A1 * | 12/2010 | Wang | H03L 7/07 713/502 |
| 2012/0054376 A1 | 3/2012 | Vaynberg et al. | |
| 2012/0250866 A1 * | 10/2012 | Matsuo | H04L 9/0841 380/279 |
| 2013/0111076 A1 | 5/2013 | Vaynberg et al. | |
| 2013/0275811 A1 * | 10/2013 | Wong | G06F 11/079 714/37 |
| 2014/0250215 A1 * | 9/2014 | Bowen | G06F 21/57 709/223 |
| 2015/0127859 A1 * | 5/2015 | Wang | G06F 13/385 710/63 |
| 2016/0104163 A1 * | 4/2016 | Aquino | G06Q 20/4016 705/44 |

OTHER PUBLICATIONS

"USB Event Tracing for Windows", Published on: Nov. 7, 2012 Available at: https://msdn.microsoft.com/en-us/library/windows/hardware/jj151577(v=vs.85).aspx.

"USBlyzer—USB Protocol Analyzer and USB Traffic Sniffer", Published on Apr. 10, 2008 Available at: http://www.usblyzer.com.

"International Search Report and Written Opinion Issued in PCT Application No. PCT/US2017/036470", dated Dec. 1, 2017, 26 pages.

* cited by examiner

MONITORING PERIPHERAL TRANSACTIONS

BACKGROUND

The Universal Serial Bus (USB) is an industry standard set of communications, power, and hardware protocols used between computing devices and various peripheral devices. Such devices may include, for example, desktop and mobile computers, smartphones, tablets, keyboards, digital cameras, printers, media players, memory devices, and other such devices.

Issues may sometimes arise when using USB to communicate between devices. For example, data transfer rates may become slow or inoperative, or a device that is using the USB port to charge the device may not be charging. Users may not have access to information to identify and correct the issue.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
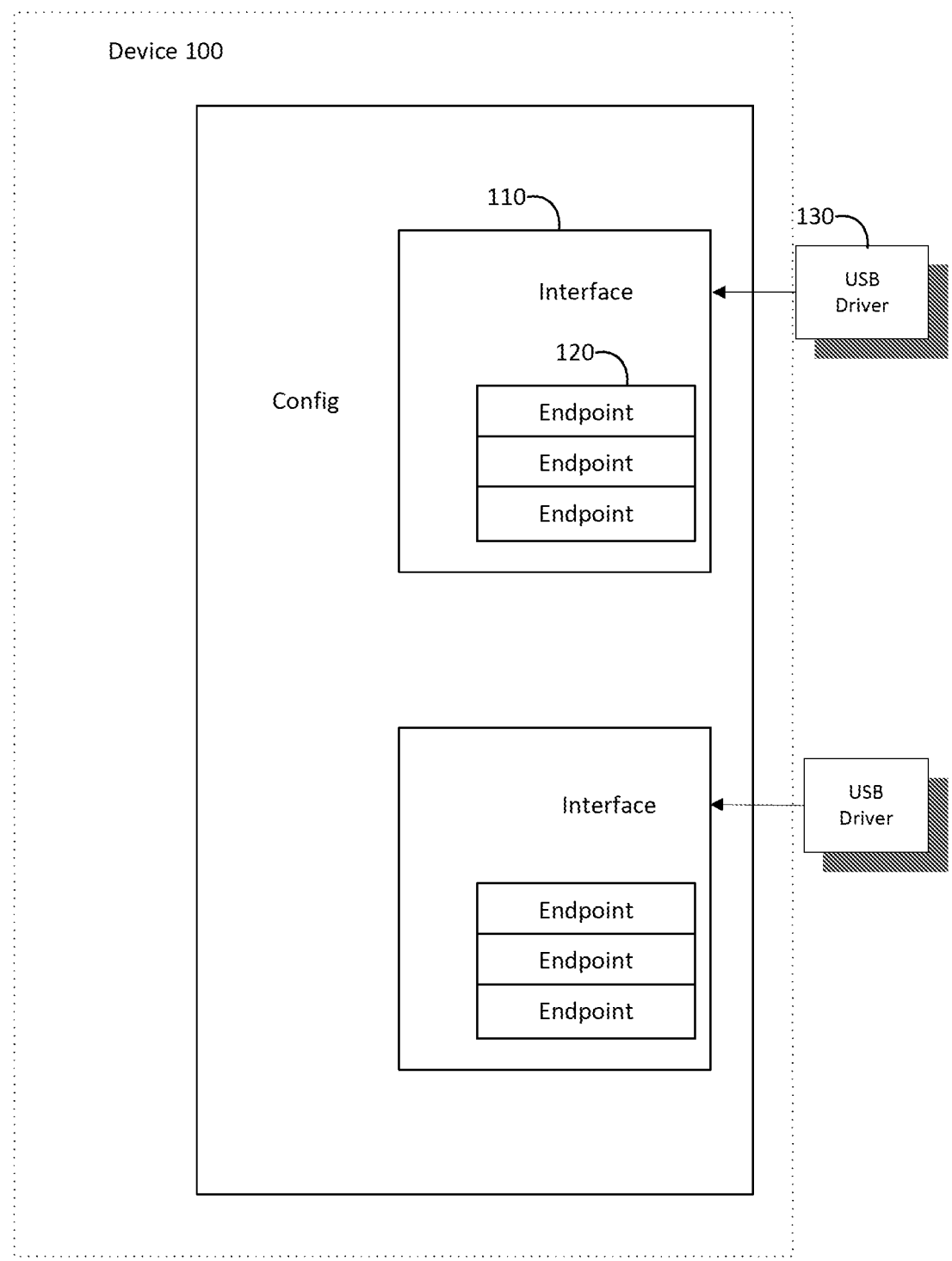
FIG. 1 is a diagram illustrating an example of a USB environment.

Many computing devices that use protocols such as Universal Serial Bus (USB), such as smart phones and tablets, are unable to access and collect USB traffic packet and transaction error rate information on the device. In order to obtain such USB error rate information, a specialized USB-protocol-analyzer box typically needs to be physically connected to intercept the USB traffic. The intercepted data is later analyzed. However, there are several shortcomings of this approach: 1) a typical USB analyzer is expensive, and not accessible to normal users of devices for everyday troubleshooting; 2) use of a USB analyzer is impractical in most cases, especially when the user is in transit or when the user is using the device in a mobile scenario; and 3) connecting a USB analyzer to the device may alter characteristics of the usage scenario and therefore may not capture an accurate representation of the scenario of interest. Furthermore, tools such as a USB analyzer often inject probes into the data stream which may alter the data traffic. Another problem is that it may be difficult to determine if a probe was lost.

Embodiments of systems and methods are described for implementing functionality in a device that allows for USB information to be accessed and collected on the device. In one embodiment, functionality can be added to the USB driver software to capture information pertaining to USB data traffic. The captured data may include, for example, the USB error rate. The data can be captured and stored locally on the device for analysis. Additionally and optionally, the captured data may be sent to other devices and systems over a communications network for off-device storage and analysis.

The stored data can be aggregated and analyzed to identify profiles, patterns, and various statistics. For example, through analysis of error rates, health and performance of a connected device and associated components such as the connector and cable can be determined. Data mining of collected USB data traffic can be useful to identify various characteristics for inferring the current state of a connection and a device or a group of devices.

It should be noted that while some example implementations are described with reference to USB connections and devices, the described principles can be applied to other types of communications where direct access to the data traffic is difficult to access, such as Wifi, Bluetooth, HDMI, and other communications technologies.

Various aspects of the disclosure are described herein with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the description detailed herein, references are made to the accompanying drawings that form a part hereof, and that show, by way of illustration, specific embodiments or examples. The drawings herein are not drawn to scale. Like numerals represent like elements throughout the several figures.

In some embodiments, an analytics engine may be provided on the device and/or off the device that can implement various techniques for classifying sets of data. For example, a machine learning engine can be implemented that executes a probabilistic classifier such as a naive Bayes classifier to determine error types and other states of a device based on the collected data.

By providing a function that collects USB data traffic, the need for hardware test equipment may be eliminated. Furthermore, new or modified features may be readily incorporated by updating software rather than updating hardware in the test equipment.

Furthermore, implementation of the data collection functionality at the driver level can allow for greater accuracy and relevance of the data. For example, if the functionality is implemented at a higher abstraction level such as the application layer, delays may result in providing the data, resulting in less accurate data collection. By collecting the data at a lower level than the driver, the cost of implementation may increase. Implementing the functionality at the driver layer may therefore provide more accurate error data that approach real-time qualities while reducing implementation cost.

After characterizing or classifying the collected data, the device or other off-device analysis engine may provide reports or generate status and error warnings. The reports and status information may allow analysts to modify designs, improve functionality, and improve device maintenance. Alerts may also be provided to the user to inform the use of issues as well as providing recommendations for mitigation actions.

With access to the USB data, information regarding device performance may be provided that was not previously available. For example, USB devices are typically connected and disconnected on a frequent basis, and there is often no way for a user to know that the limits to a connector's mate/demate cycles may have approached, resulting in reduced connector performance. Damage and misuse may also cause early failures to a connector and/or cable. By collecting error rate information, an analytics engine may process the information to identify whether the observed error rates are characteristic of connector failures. Today, users have limited information to determine whether data connection issues are due to connector or cable failures, or some other performance issue in the device's hardware or software.

The USB error rate is one type of data that may be collected and used for analysis. Other data types may be used that may be analyzed to identify some indication of quality. The types of information and alerts that may be provided can vary, such as reports, alerts, and other user information. In some embodiments, information from multiple devices can be sent over a network, if available, to a collection service that may execute on a server in a data center. An entity such as a device manufacturer or service provider may collect and aggregate USB error rate and other data. The entity can monitor quality of multiples device. The entity may also analyze the data to identify trends and profiles of common failure modes.

In some cases, an entity may identify a maintenance issue for a device and send an alert to the device so that the user may take an appropriate action. For example, data collected for a particular device may indicate that the USB connector is exhibiting properties that are characteristic of a device that is overheating due to being left in direct sunlight.

In some embodiments, an analytics engine may execute on the device. USB data may be collected and analyzed on the device without sending the data to an off-device entity for USB data collection and analysis. In other embodiments, an analytics engine may be cloud-based or otherwise available remotely (off-device). In one embodiment, a device may operate in both an online or on-device mode, where USB information is sent to the off-device entity for storage, aggregation, and analysis, and an offline mode, where the device may store the collected USB information for local storage and analysis. In some embodiments, both modes may be in operation simultaneously. Where there is no network connectivity, a device operating in both modes may send USB data to the off-device entity for processing. When network connectivity resumes, the device may process the USB data locally. In some embodiments, the device may simultaneously process the data locally and send the data to the off-device entity for processing.

In some embodiments, an on-device data manager may be implemented that is configured to interact with the device's user interface and other functions and provide appropriate messages and alerts as they are generated or received, based on the collected USB information. The alert information may be generated locally or received by the off-device entity.

The data collection functionality that is implemented in the USB driver may be configurable. The data collection rates and data collection types may be configured by appropriate interfaces such as an application programming interface or some other control mechanism for configuring the USB driver. The data may be collected for defined time periods, or on a continuous basis or periodic basis.

Various aspects of the disclosure are described with regard to certain examples and embodiments, which are intended to illustrate but not to limit the disclosure.

FIG. 1 illustrates an example USB device 100 including interfaces 110, endpoints 120, and drivers 130. The drivers 130 typically bind to interfaces. A USB endpoint can be one of four different types that describe how the data is transmitted. Control endpoints are used to allow access to different parts of the USB device, and may be used for configuring the device, retrieving information about the device, sending commands to the device, or retrieving status reports about the device. Interrupt endpoints transfer small amounts of data at a fixed rate when the USB host asks the device for data. Interrupt endpoints are also used to send data to USB devices to control the device. Bulk endpoints are used to transfer large amounts of data. Bulk endpoints are used by devices to transfer data without data loss. Isochronous endpoints are also used to transfer large amounts of data, but the data is not always guaranteed. Control and bulk endpoints are used for asynchronous data transfers as determined by the driver. USB endpoints are bundled up into USB interfaces, which handle one type of a USB logical connection. A USB driver typically controls a USB interface. USB interfaces are bundled up into configurations. A USB device can have multiple configurations.

In the USB protocol, a USB transaction consists of a token packet, an optional data packet, and a status packet. USB packets consist of a sync field used to synchronize the clock of the receiver with that of the transmitter, and a packet ID (PID) used to identify the type of packet that is being sent which may include one of the following:

| Group | PID Value | Packet Identifier |
| --- | --- | --- |
| Token | 0001 | OUT Token |
| | 1001 | IN Token |
| | 0101 | SOF Token |
| | 1101 | SETUP Token |
| Data | 0011 | DATA0 |
| | 1011 | DATA1 |
| | 0111 | DATA2 |
| | 1111 | MDATA |
| Handshake | 0010 | ACK Handshake |
| | 1010 | NAK Handshake |
| | 1110 | STALL Handshake |
| Special | 0110 | NYET (No Response Yet) |
| | 1100 | PREamble |
| | 1100 | ERR |
| | 1000 | Split |
| | 0100 | Ping |

The address field specifies which device the packet is designated for. The endpoint field is made up of 4 bits, allowing 16 possible endpoints.

The USB protocol has four different packet types. Token packets indicate the type of transaction to follow, data packets contain the payload, handshake packets are used for acknowledging data or reporting errors, and start of frame packets indicate the start of a new frame. There are three types of handshake packets:

ACK—Acknowledgment that the packet has been successfully received.

NAK—Device cannot send or received data. Also used during interrupt transactions to inform the host there is no data to send.

STALL—The device is in a state that requires intervention from the host.

Figure 2:
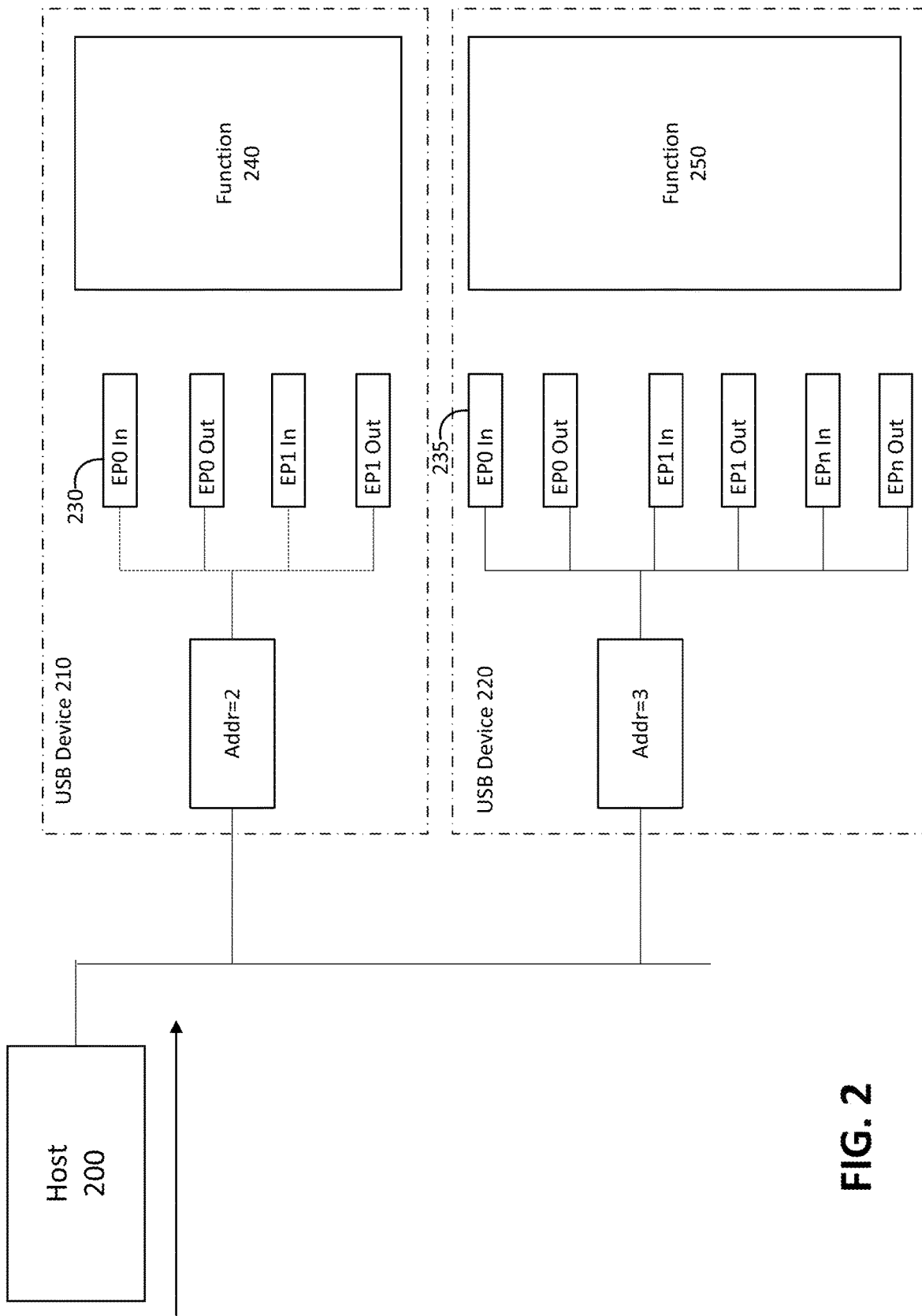
FIG. 2 is a diagram illustrating an example of a USB environment.

A USB device may be any USB transceiver device used at the host or a peripheral, a USB hub or host controller device, or a USB peripheral device. As illustrated in FIG. 2, showing host 200 and USB functions 240 and 250 implementing buffers 230 and 235 on USB devices 210 and 220 belonging to endpoints such as EP0 IN and EP0 OUT. Endpoints are typically sources or sinks of data. Endpoints can also be seen as the interface between the hardware of the function device and the firmware running on the function device.

While the device sends and receives data on a series of endpoints, the client software transfers data through a pipe which is a logical connection between the host and endpoint(s). Pipes also have a set of parameters associated with them such as how much bandwidth is allocated to it, what transfer type (Control, Bulk, Iso or Interrupt) it uses, a direction of data flow and maximum packet/buffer sizes.

USB traffic is made of transactions, each transaction comprising packets. Each transaction has one handshake (Ack) packet. There are four possible values in a handshake packet: ACK, NAK, STALL, and NYET. Other than the ACK which means successful, the other three types (NAK, STALL, and NYET) can be classified as error conditions. These error conditions, among other data, may be useful to collect, store, and track.

In some embodiments, counters may be implemented to track the USB data. In one embodiment, four 64 bit integer variables may be created in the USB device driver (for example, the ufxchipidea.sys driver for the Chipidea type USB controllers). Each of the 64 bit variables may be configured to operate as a counter for one of the four handshake packets. For example, when an ACK packet is received, the associated counter may be incremented. By using 64 bit counters, data can be accumulated for a significantly long time period without the risk of losing data.

In an embodiment, the packet status in ufxchipidea.sys may be accessed by reading the packet status information stored in the registers. For example, the register ENDPT-NAK has a NAK status bit for each endpoint.

In some embodiments, one or more input/output controllers (IOCTL) may be implemented to access and reset the handshake counters. One IOCTL may be implemented for accessing the counter. Another IOCTL may be implemented for resetting the counter to zero.

In some embodiments, an upper layer service may be implemented to collect and store the data. Additional services may be implemented to perform operations on the collected data. For example, the error rate may be calculated by dividing the error count by success count. The error rate may be useful in detecting hardware issues in new hardware, software regressions, performance tuning, etc.

An error rate over time can be calculated, for example, by dividing the error count by a period of time over which the error count has been accumulated. The error count data as well as any processed data can be sent to an off-device service for storage and/or analysis. For example, the data may be sent to a server as telemetry data.

In some embodiments, the collected data may be analyzed to determine statistical information. Furthermore, data mining may be performed to identify trends and patterns related to USB function, health, and performance. In one embodiment, a USB analytics engine may be provided to analyze the data. The analytics engine may be implemented, for example, as a rate detection vector engine. The detection vector engine may incorporate a Naive Bayes classifier, fuzzy logic, and other methods. The detection vector engine may be configured to determine which data patterns are relevant for error analysis.

In some embodiments, the detection vector engine may implement a pattern classification system to identify relevant data. For example, the detection vector engine may include a learning system that may include a learning function to continuously learn which data patterns are relevant to a particular potential problem. In some embodiments, supervised learning may be incorporated where administrators of an off-device data storage and analysis service may classify observations made from various devices and a number of error types. The off-device data storage and analysis service may assign metadata to the observations. The metadata may be updated by a learning system to update relevance to the profiles of interest as new observations are made and assigned tags to the new observations. The data storage and analysis service may learn which observations are alike and assign metadata to identify these observations. The learning system may classify future observations into categories.

In some embodiments, an algorithm, such as a feature subset selection algorithm or an induction algorithm, may be implemented to define groupings or categories. Probabilistic approaches may also be incorporated. One or more estimation methods may be incorporated, such as a parametric classification technique. In various embodiments, the data storage and analysis service may employ a combination of probabilistic and heuristic methods to guide and narrow the data that are analyzed.

In order to provide relevant results that are more likely to indicate causes for a particular observed pattern of data, the most relevant patterns may be identified and weighted. In some embodiments a heuristic model can be used to find satisfactory solutions that provide an acceptable confidence level in the results. For example, experience-based techniques, such as expert modeling can be used to aid in the initial selection of parameters. The heuristic model can probabilistically indicate parameters of likely impact through, for example, tagging various metadata related to a particular pattern. Feedback from an initial round of analysis can be used to further refine the initial selection, thus implementing a closed loop system that generates likely candidates in situations where programmatic approaches may be impractical or infeasible. As an example, Markov modeling or variations thereof (e.g., hidden Markov model and hierarchical hidden Markov model) can be used in some embodiments to identify candidate responses that may otherwise be missed using traditional methods. Monte Carlo methods and finite element analysis can also be used to generate results in various embodiments.

In general, an off-device data storage and analysis service may implement the detection vector engine as well as other functionality to provide information to various users. For example, the off-device data storage and analysis service may allow the data to be accessible via a web site, or may allow the data to be accessible to users via a cloud-based system. The off-device data storage and analysis service may also allow device support and operations services to access the data via the website or through a side channel. The device support and operations services can therefore access the error levels, warnings, and information status to provide appropriate and timely services to users. For example, design and quality assurance personnel can access the data to make improvements to the design and production processes.

The off-device data storage and analysis service as well as an on-device function may provide useful alerts and information to the user of a device via a user interface of the device. As an example, in one scenario, a healthy device indication may be provided to the user. In one customer alert scenario, the data for the user device may be associated with two profiles—bulk and isochronous. In one example, the device may operate without issues in the bulk profile but not in the isochronous profile. Customers may report that a newly acquired USB hard drive from Company A is experiencing a low file transfer speed on the USB 3.0 port of the device. The customer support center for the device manufacturer may invoke a diagnostic tool, which may implement some or all of the features of the detection vector engine described above. Using the aggregated data for the user's device as well as data for other devices, including but not limited to noise to data ratio, error rate, and the USB profile, the customer support center may determine that the most likely cause of the low file transfer speed is due to a fault with the USB cable. The customer support center may send a message to the user indicating that a new or repaired cable may resolve the issue resolved.

In another customer alert scenario, a USB device health alert may be provided to the user. The alert may notify the user of detected abnormal behaviors that may be impact the user experience.

In one example of a service center oriented scenario, the service center may receive a large number of returned devices. The service center may categorize the returned devices based on collected and analyzed information for the devices. For example, the devices may be categorized as having normal function, USB port failure, a software issue, a hardware issue, etc. By having the ability to categorize the returned devices, the service center can save significant costs by not having to test and evaluate the devices. In another service center oriented scenario, during manufacturing and production, USB diagnostic information can be useful as part of the quality assurance process. Error information may be collected without using hardware protocol analyzers, thus saving costs during production.

In an example customer evaluation scenario, a user may observe random external USB device glitches or performance fluctuations. Factors that may cause such glitches or fluctuations may include heat or cold, temperature changes, vibration, insulation, noise, and other factors. Data related to these factors may be collected and analyzed, using the Naïve Bayes Algorithm, for example, to predict the performance. In some embodiments, an alerting system may be implemented that provides an alert to the user, informing the user of a potential performance impact and actions that may be taken to mitigate the circumstances and impact to performance.

For example, a user who is using a device with a USB port in an automobile may be driving with the device in direct sunlight, causing the temperature of the device to rise. Furthermore, the automobile may be traveling at a high speed that is causing a problematic vibration signature. The device may analyze the USB error information and generate an alert message to notify the user that performance of the device may be degraded due to the high temperature and vibration profile. Information may continue to be collected and analyzed as the device is moved to a more stable environment. A subsequent alert may be generated when normal device performance is resumed.

The detection vector engine may further be configured to classify and generate information in the form of recommendations pertaining to USB congestion, reliability and error rates, and routing profiles in real time and normal modes.

The functionality described herein may be implemented as software. Unlike certain protocols such as 802.11, Bluetooth, and Ethernet, which have rich software protocol layers on top of hardware, most USB logic is embedded within the hardware. The techniques described herein may provide access to data that was previously only available via hardware or at least difficult to access without special purpose equipment.

In further embodiments, a two-tiered model may be implemented to analyze and troubleshoot USB device data. The first tier may be the local device, and the second tier may be an off-device service that may be implemented, for example, on computing capacity hosted in a cloud computing environment or some other computing environment. In one embodiment, the local device may manage the personal USB interfaces such as phone USB ports, tablet USB ports, the device's USB ports, and so on. The local device may implement functions that provide actionable solutions that can be recommended to the user to troubleshoot or correct USB-related issues. For example, the local device may notify the user that a USB cable should be replaced after determining that the cable is the most likely cause of a data transmission speed issue.

Figure 3:
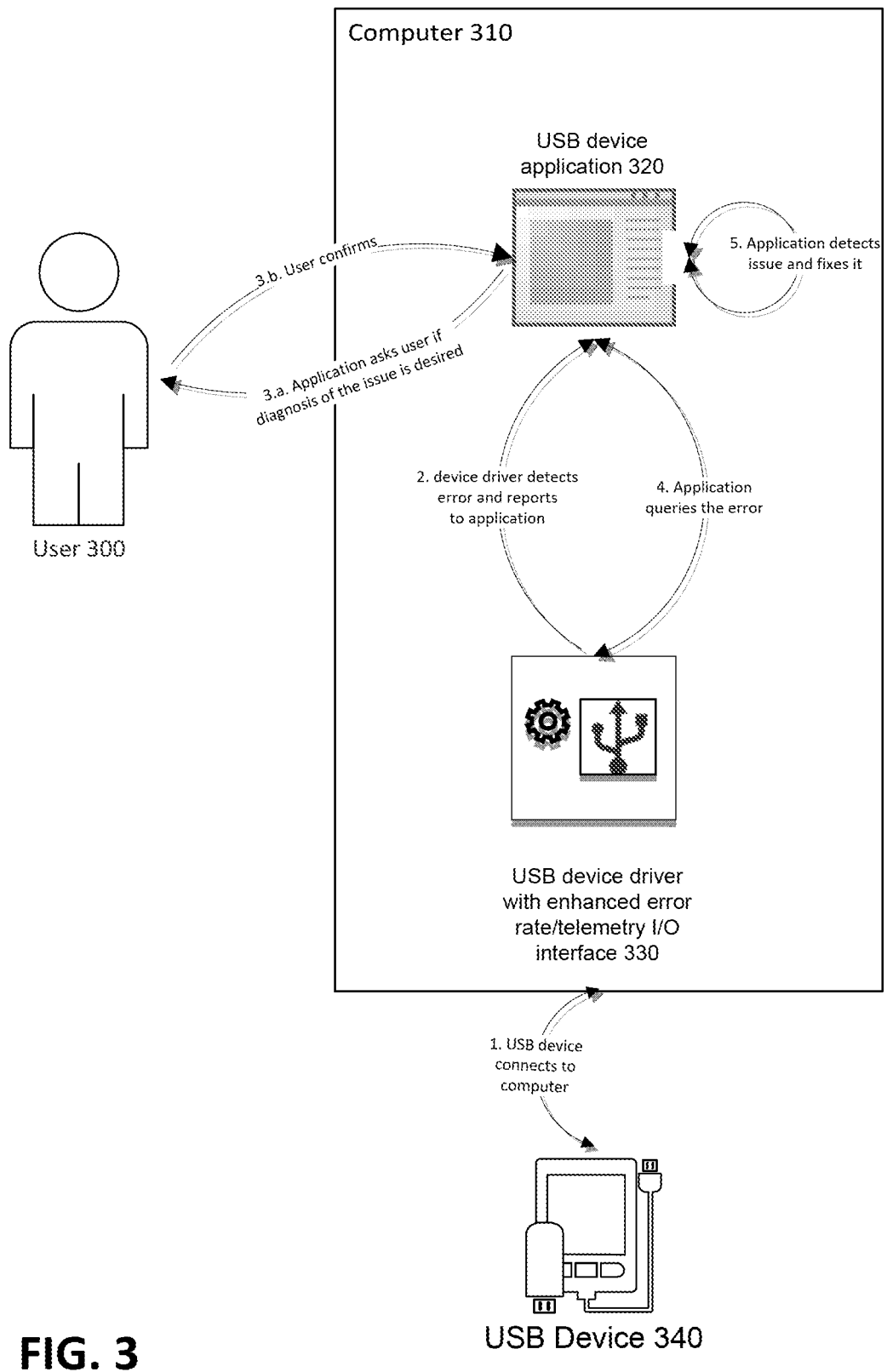
FIG. 3 is a diagram illustrating a local computer troubleshooting work flow and corresponding time sequence.
Figure 4:
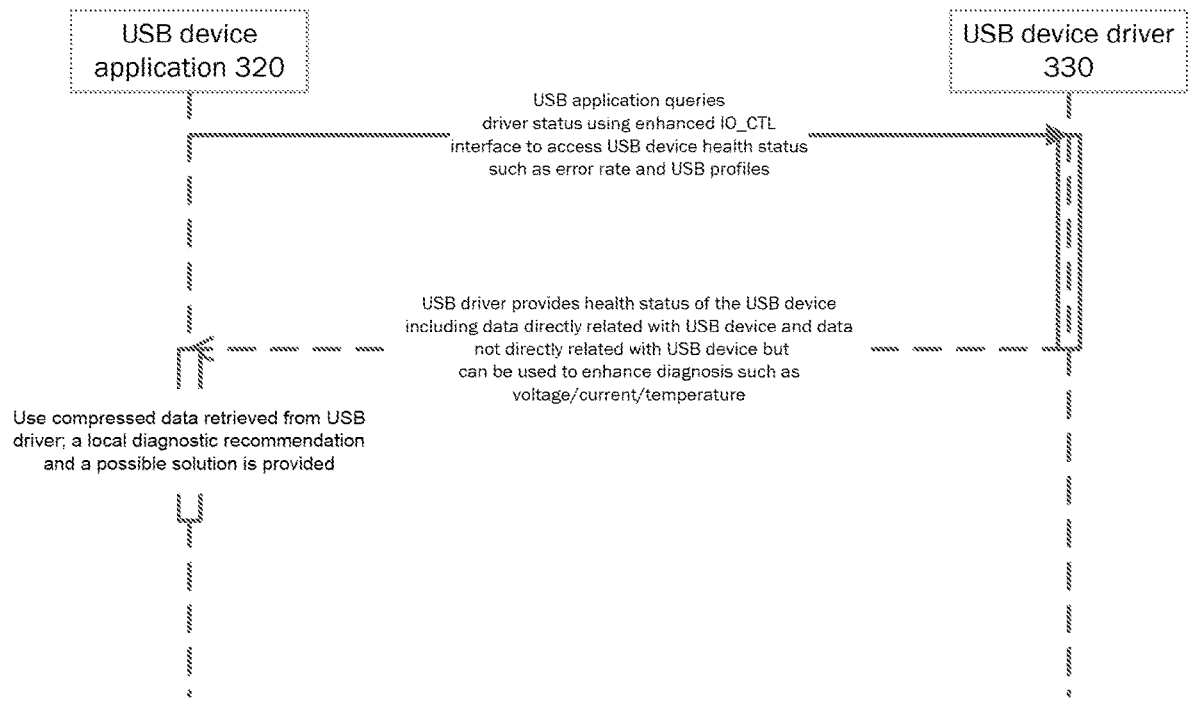
FIG. 4 is a diagram illustrating a local computer troubleshooting work flow and corresponding time sequence.

FIGS. 3 and 4 illustrate a local computer troubleshooting work flow and corresponding time sequence, APIs, and protocols. In the figures, the USB driver 330 provides an I/O interface that provides not only raw USB data, but also pre-aggregated data and supporting data based on temperature, current, and voltage. A USB analytics engine (not shown) may use this data to generate predictions and recommendations for resolution of issues. In one embodiment, a USB device 340 may connect to computer 310. The computer 310 may have a USB driver 330 that has enhanced functionality to track and monitor USB transactions as described herein. The USB driver 330 may be configured detect an error and report the error to a USB device application 320. The USB device application 320 may generate an inquiry on a device interface, requesting an input from the user 710 as to whether the user 300 would like to perform a diagnosis of the issue. In response to acknowledgement from the user 300, the USB device application 320 may detect the issue and generate a recommended action to correct the issue. FIG. 4 illustrates dataflows between USB device application 320 and USB driver 330. As shown, the USB device application 320 may query driver status using an enhanced IO_CTL interface to obtain device health status such as error rate and USB profiles from USB driver 330. USB driver 330 may provide health status of the USB device 740 including data directly related with USB device 340 and data not directly related with USB device 340 but can be used to enhance diagnosis such as voltage, current, and temperature. USB device application 320 may use compressed data retrieved from USB driver 330. USB data analytic engine 730 may use the data to generate a local diagnostic recommendation and a possible solution to the issue.

In some embodiments, an off-device service may be provided. In one embodiment, a cloud-based analytical engine may be provided that can be configured to receive and analyze data from one or more local devices. The cloud analytical engine can be accessed, for example, if the local computer is unable to resolve an issue. The cloud analytical engine may use multiple data sources to identify and suggest action items to users. Such data sources may include, for example, historical telemetry data, USB device and chipset manufacture information, and troubleshooting history for corresponding USB devices.

A dynamic statistical model can be established using data from multiple devices. The data may include historic data where devices have previously failed. Other data may include device type, manufacturer, size, year, model, length of time that the device has operated in a particular setting, geographic and physical location data, temperature, humidity, and usage pattern (e.g., continuous operation, minimal usage, or infrequent spikes in usage). With the accessed data, in one embodiment machine-learning can be used to cluster the data by various axes. A probability distribution function can also be determined for each type of device that is being used in a similar fashion. The types may include, for example, manufacturer, model, size, age, historic and current usage patterns, and utilization for the device. A range in the probability distribution function that includes the majority of the healthy devices can then be determined. The model can identify devices that are outliers in the probability distribution function and initiate actions to notify the identified devices. The model can, for example, identify parameters such as the distance that outliers need to be from a given probability distribution function before a notification action is considered.

The off-device service may improve the user experience by providing more accurate diagnostic results and calculation of trackable trends for devices that may not be performed on a single device. Trends can include, for example, expected life span, performance, and device stability.

Figure 5:
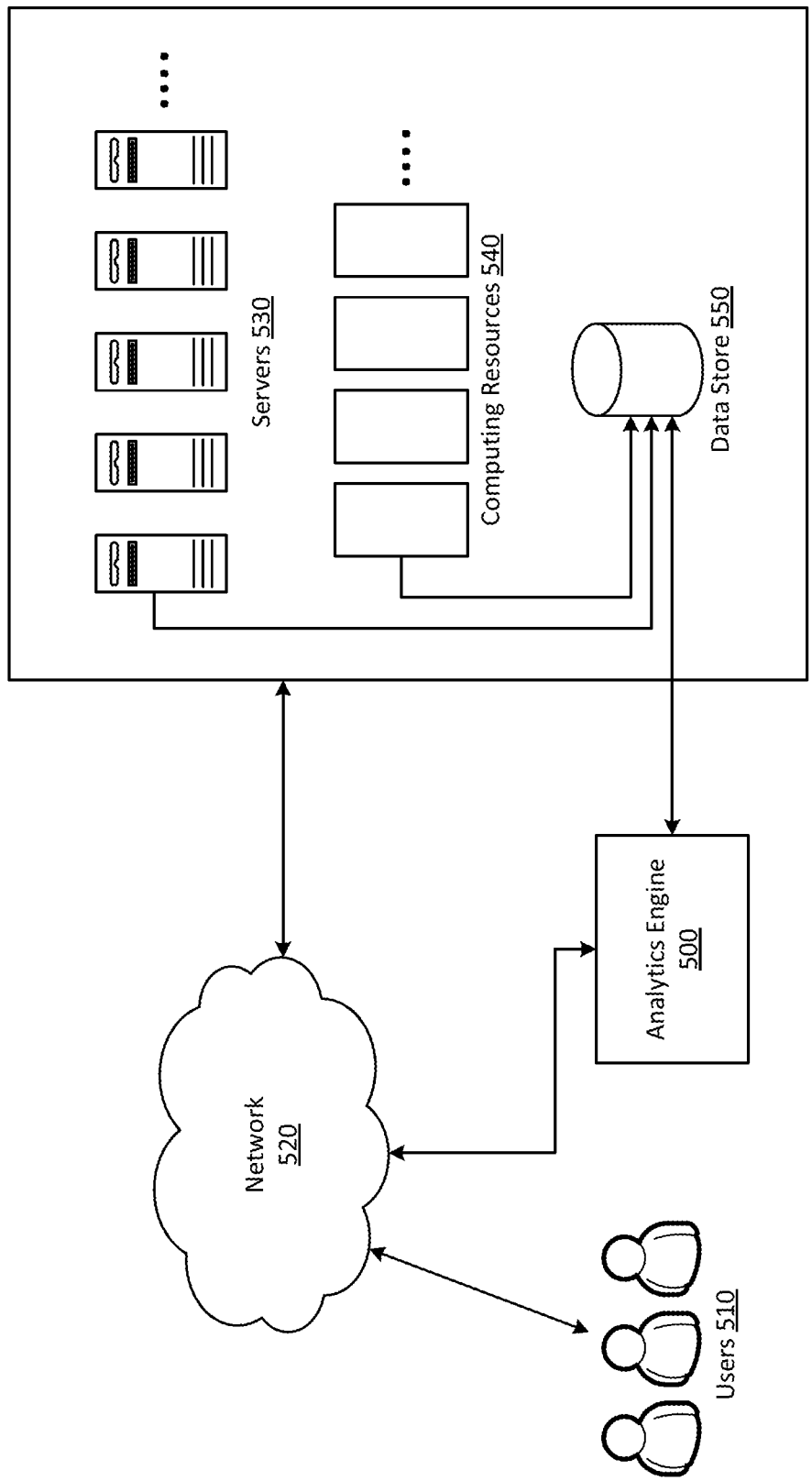
FIG. 5 is a diagram illustrating an analytics engine for identifying issues.

FIG. 5 is a diagram illustrating an analytics engine 500 for identifying issues in accordance with the present disclosure. In FIG. 5, an off-device service may include resources and applications that may execute, for example, on one or more servers 530. It will be appreciated that some embodiments may involve additional computing resources 540 of various types that may be provided.

FIG. 5 also illustrates a network 520 that may provide communications for one or more computers accessible by users 510. According to one embodiment, resources executing on servers 530 may be configured to provide support services to users 510 via network 520. FIG. 5 also illustrates a data store 550 that may store data pertaining to various events and metrics for devices of users 510.

A request may be sent to analytics engine 500 for monitoring and analyzing one or more user devices. The analytics engine 500 may be co-hosted with the servers 530 and data store 550, or may reside on devices of users 510, or a combination thereof. In some embodiments, a request may be received from a device of one of the users 510 for analytics services. In other embodiments, the request may be received from one or more services at the device manufacturer. In response to receipt of the request, analytics engine 500 may log the request and provide updates as to the status of the request. The analytics engine 500 may communicate with other services to facilitate: (1) processing of the request, (2) collection of data pertaining to request, and (5) generating interfaces to provide results of the request. The analytics engine 500 may, for example, provide an interface for facilitating submission of the request. The analytics engine 500 may further provide an interface for viewing the results of the request and modifying or cancelling the request.

Failure prediction engine 500 may be configured to provide analysis and diagnostics for providing predicted event probabilities based on real time or accumulated and/or archived monitoring of various devices. The analytics engine 500 may access metrics, such as device type and device usage activity. The analytics engine 500 may be made accessible via an application programming interface (API) or a user interface that may be accessed via a Web browser or other input mechanisms.

In some embodiments, an expert system that utilizes logical inferences based on available information may be used. An expert system may take available information pertaining to actual failures of devices and use the information as input to a rules-based system to generate updated event probabilities. The available information may be provided to, for example, a Bayesian process to determine an updated probability for the event.

Within this operating environment, analytics engine 500 may determine a predicted probability of a failure or other event. Analytics engine 500 may gather data from other components of the operating environment, such as data store 550. Data store 550 may collect information from devices of users 510, among others. The analytics engine 500 may also collect information stored in log files and other locations that may be available from computing resources 540. The information may also be obtained by querying devices for data that is not currently being stored in a log file.

In some cases, analytics engine 500 may not have access to all available data for the relevant devices because doing so would take too much time, would require too much storage space to store, or some of the data may have been determined to have a low likelihood of being relevant to determining the event rate for the device of interest. In other cases, some of the data may be configured only to be accessible manually or may be unavailable because the data is on a network segment to which the analytics engine 500 does not have access. The analytics engine 500 may use the available information to determine an initial probability for an event and update the probability as more information becomes available.

Bayesian probability techniques may be used to determine initial (prior) and updated (posterior) probabilities for events. In one example, P(S) is what is known about the probability of a device failure without factoring in other information for the device and may be referred to as the prior probability in Bayesian terminology. Then P(S|N) is the likelihood of a device failure if the device is, for example, in a high temperature situation and may be referred to as the posterior probability in Bayesian terminology. The posterior probability can continue to be adjusted as additional factors are considered.

After the probability has been calculated, a decision as to whether an alert should be sent to the user may be determined. In some embodiments, a probability analysis may be performed based on machine learning via a machine learning system that includes one or more learning functions that learns the probabilities associated with the availability of various data that may be relevant to the determination of the event probability. This probability analysis may also be performed based on history data of prior probability analyses, or performed based on a user indication of a rule to be used in the probability calculation.

In some embodiments, the analytics engine 500 may monitor failures and device attributes automatically. For example, the off-device service may monitor a number of pre-selected failure events collected or determined at a predetermined frequency. Additional failure event data may be collected at the same or different frequencies as specified by the off-device service.

Additionally, the analytics engine 500 may provide users with the ability to request and receive notifications or to take specified actions depending on the failure events. For example, an off-device service in communication with the analytics engine 500 may send an SMS message to a device that is predicted to fail. In some embodiments, the event data may be retained for a predetermined time to allow users to retrieve historical metric data for review and analysis. A user interface may be provided to allow access to the analytics engine 500.

In some embodiments, a time frame for the event prediction may be specified as well as the resources to be evaluated. For example, a user may want to determine the predicted failure rate for a group of devices over a period of one month.

The analytics engine 500 may provide a detailed analysis and summary of results to a requesting user. In some embodiments, an API may be provided to facilitate requests for event information. For example, an API can be called with information such as a device identifier and specified event. After the API is called, in one embodiment the analytics engine 500 may take actions such as:

Access previous data for the device.
Retrieve data of related devices.
Call available APIs that can provide metrics for the devices.
Invoke a probability determination function to generate a predicted probability of an event.

Using the gathered information, the analytics engine 500 may analyze the data, combine or aggregate the data or extract portions of the data as appropriate, and invoke a probability determination function to generate the predicted probability of an event. The determined event probability may be reported through the API along with details regarding potential causes for the event prediction.

When a user is initiating a request for an event prediction, the API may return metadata about the device associated with the request. A request identifier may be generated to track and process the request.

In some embodiments, attributes of the device can be selected based on biasing to identify attributes that may have greater impact on the probability calculation. For example, data for an initial set of attributes can be weighted to indicate relevance of the attributes to the failure. The weighting can be continuously updated to increase the accuracy of the biasing.

In some embodiments, an API or a programming interface may be provided for facilitating the submission of event prediction requests. The API may be configured to receive electronic messages that encode identifiers indicative of a failure prediction request for fulfillment by the analytics engine 500. In response to receiving one of the electronic messages, the API may send second electronic messages indicative of information indicating that event prediction request has been received and may provide the results of the event prediction calculation.

Figure 6:
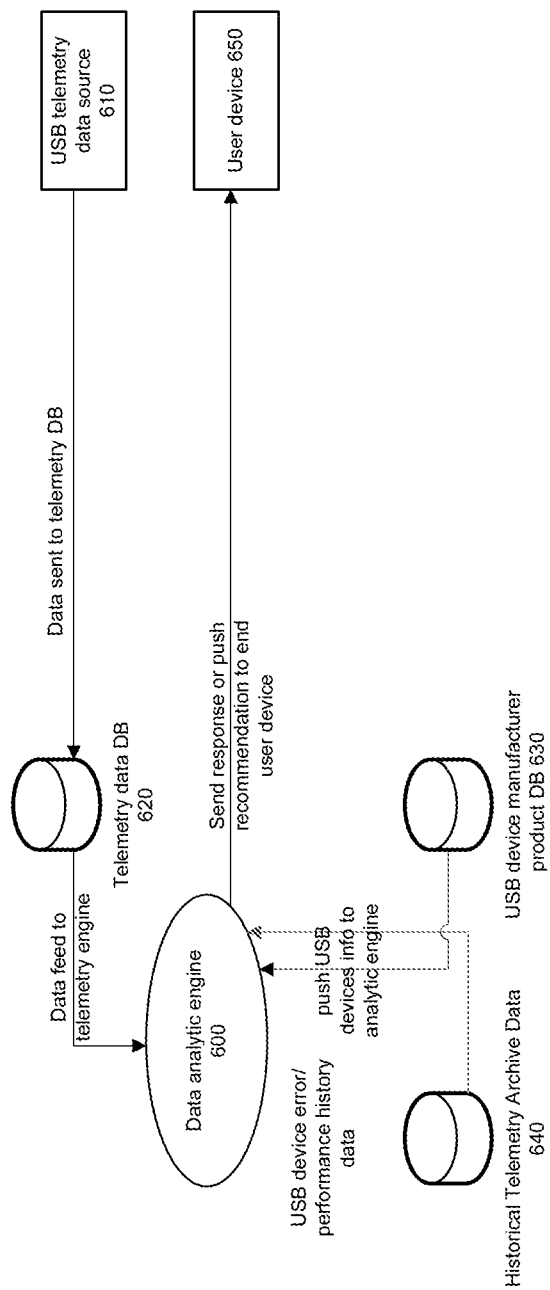
FIG. 6 is an example cloud-based analytic engine using multiple data sources.

FIG. 6 illustrates an example cloud-based analytic engine 600 using multiple data sources to generate recommendations to a user. The data sources may include data sent to a telemetry database 620 from USB telemetry data source 610, USB device manufacturer product data 630, and historical telemetry archive data 640. The illustrated cloud-based processing enables USB diagnosis and failure rate prediction. The historical telemetry data 610, USB device and chipset manufacture information 630, and corresponding USB device troubleshooting history 640 may be used by the analytic engine 600 to identify issues and generate recommendations. The recommendations may be send to the user device 650.

Figure 7:
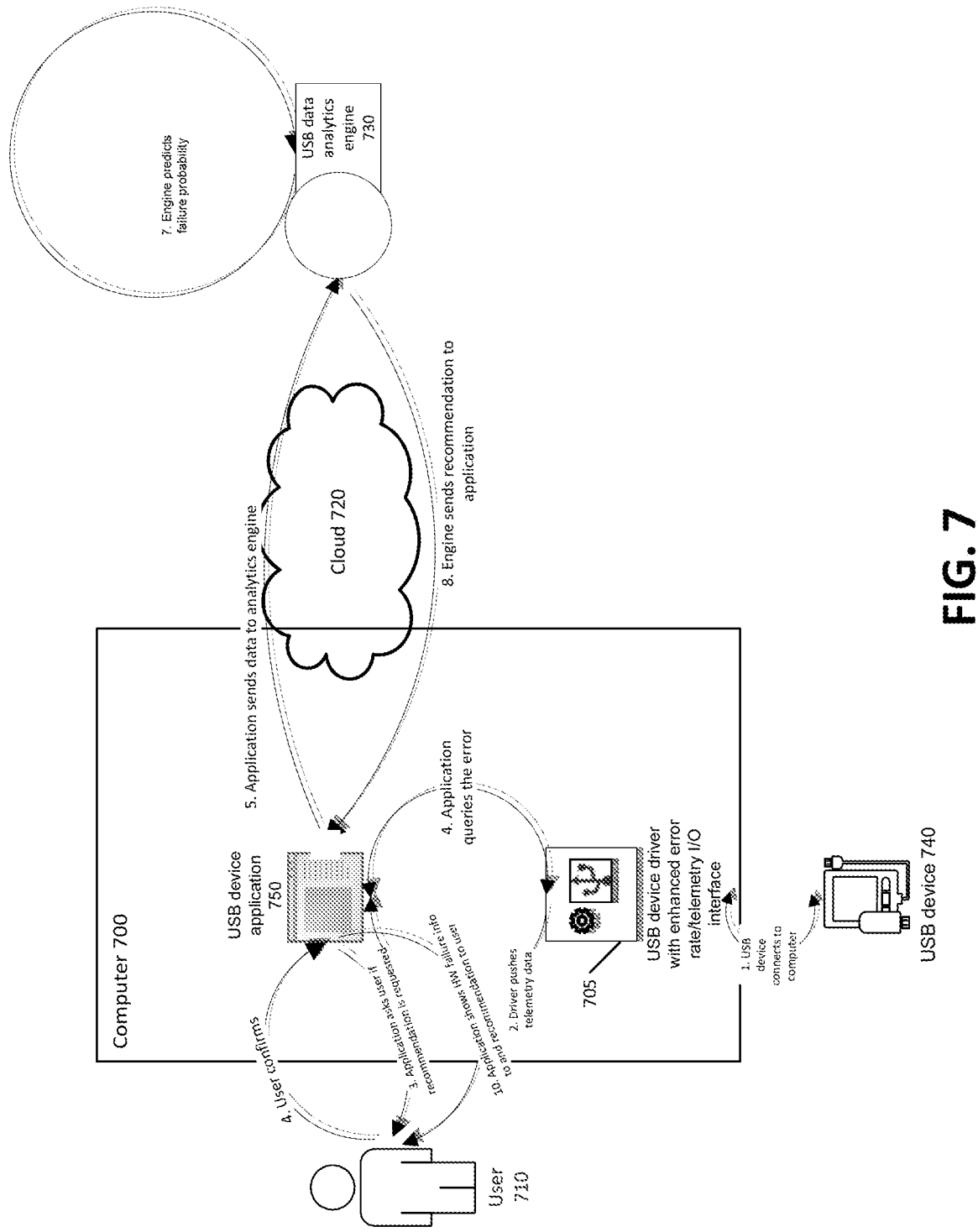
FIG. 7 is a diagram illustrating an example of a cloud-based analytic engine.
Figure 8:
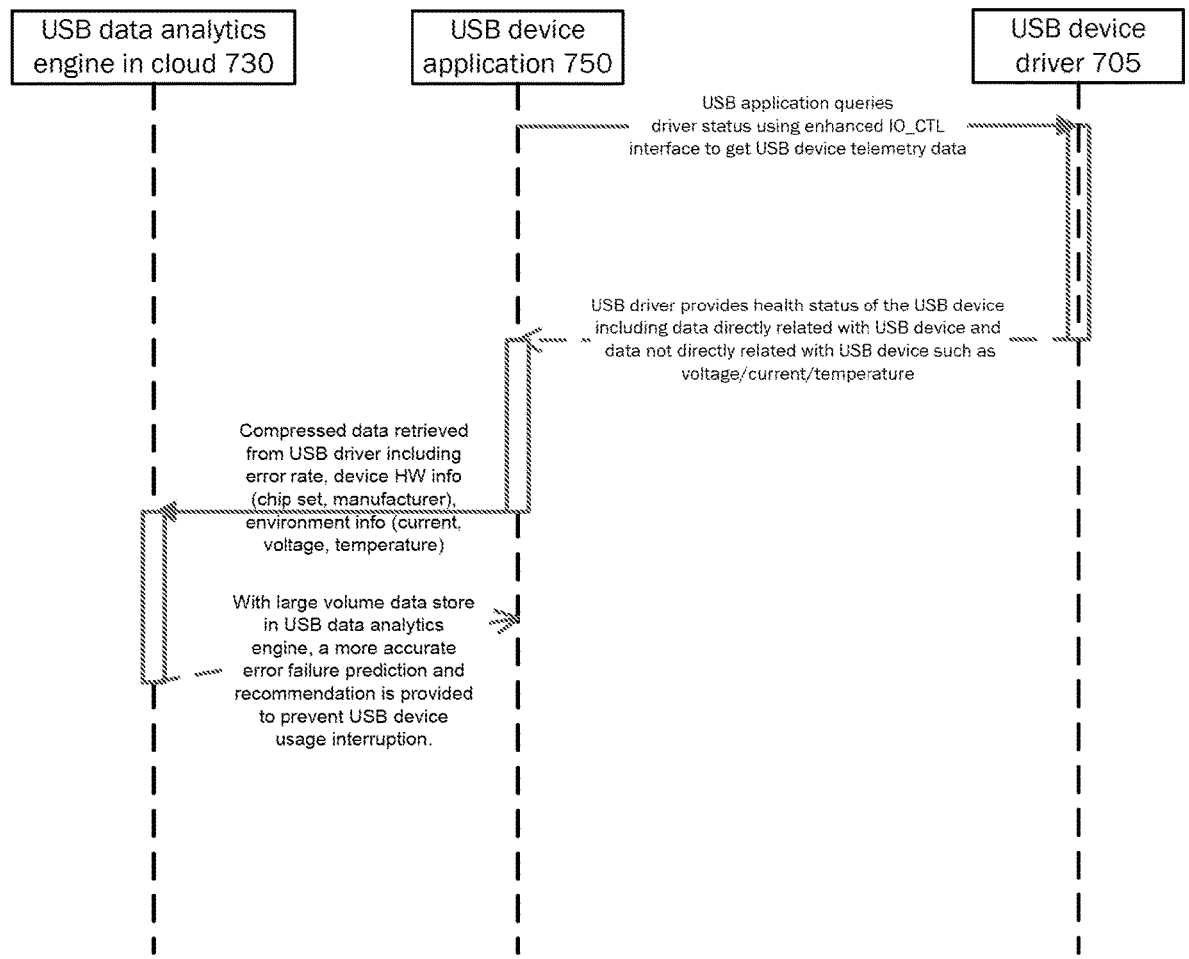
FIG. 8 is a diagram illustrating an example of a cloud-based analytic engine.

FIGS. 7 and 8 illustrate an example scenario where a USB data analytics engine 630 may provide actionable recommendations to a user. In one embodiment, a compressed data set may be sent to a USB data analytic engine 730 via a cloud 720. The USB data analytic engine 730 may utilize not only historic telemetry data, but also data from the manufacturer of applicable chipsets to provide better predictions on the future failure rate of the USB device. The USB data analytic engine 730 can also provide suggestions to the user, such as if/when the user should have a backup device to avoid data loss and device interruptions. In one embodiment, a USB device 740 may connect to computer 700. The computer 700 may have a USB driver 705 that has enhanced functionality to track and monitor USB transactions as described herein. The USB driver 705 may be configured to push telemetry data to a USB device application 750. The USB device application 750 may generate an inquiry on a device interface, requesting an input from the user 710 as to whether the user would like to communicate with the USB data analytic engine 730 via a cloud 720 to generate a recommendation. In response to acknowledgement from the user 710, the USB device application 750 may send data to USB data analytic engine 730. USB data analytic engine 730 may generate a failure probability using the data, and send a recommendation to the USB device application 750 for action by the application, such as providing an alert to the user 710. FIG. 8 illustrates dataflows between USB data analytic engine 730, USB device application 750, and USB driver 705. As shown, the USB device application 750 may query driver status using an enhanced IO_CTL interface to obtain USB device telemetry data from USB driver 705. USB driver 705 may provide health status of the USB device 740 including data directly related with USB device 740 and data not directly related with USB device 740 such as voltage, current, and temperature. USB device application 750 may send compressed data retrieved from USB driver 705 including error rate, device hardware information (e.g., chip set, manufacturer), and environment information (e.g., current, voltage, temperature). USB data analytic engine 730 may use the data to generate an error failure prediction and recommendation that may be provided to prevent a USB device usage interruption.

Figure 9:
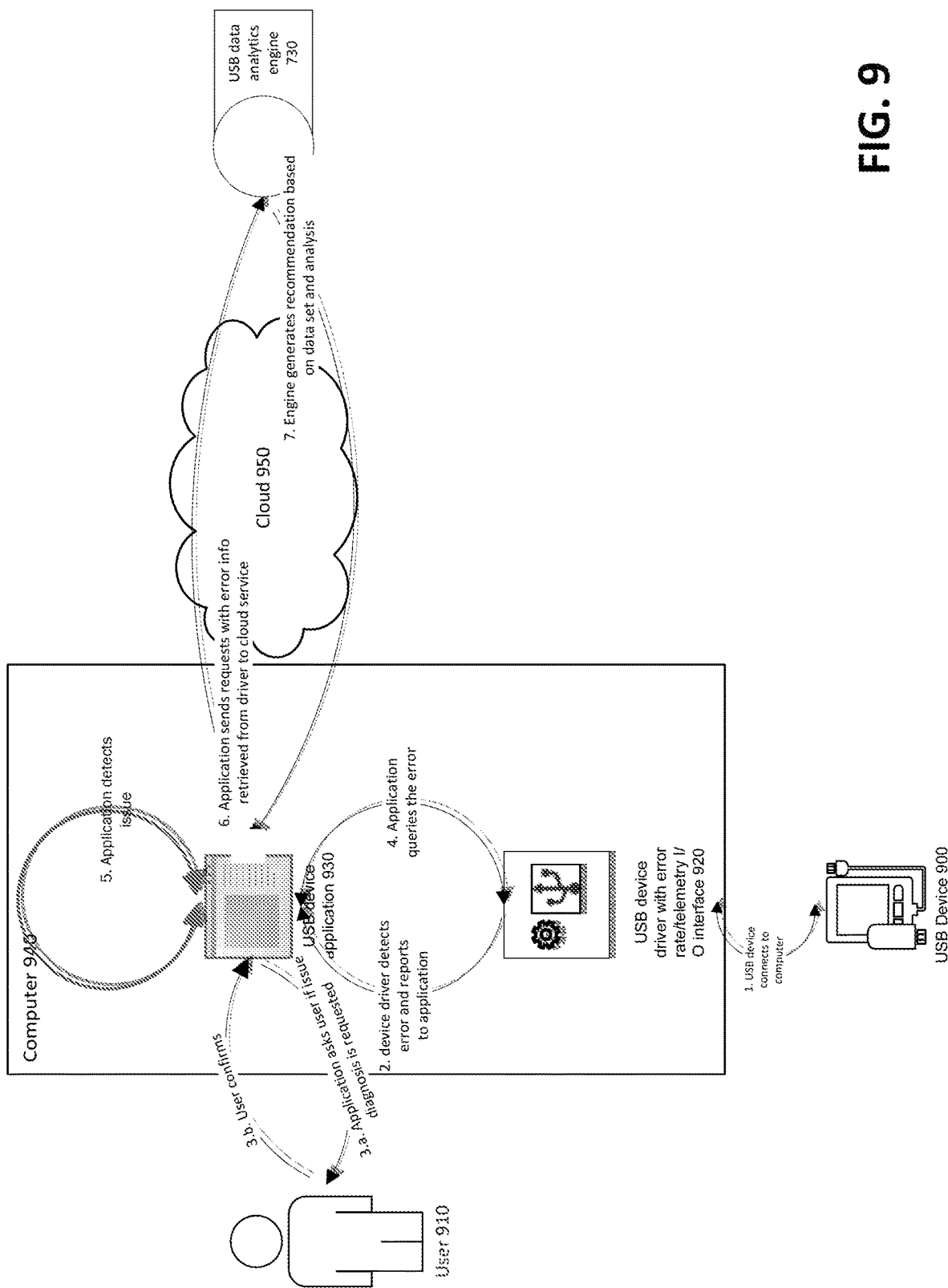
FIG. 9 is a diagram illustrating an example of a cloud-based analytic engine.
Figure 10:
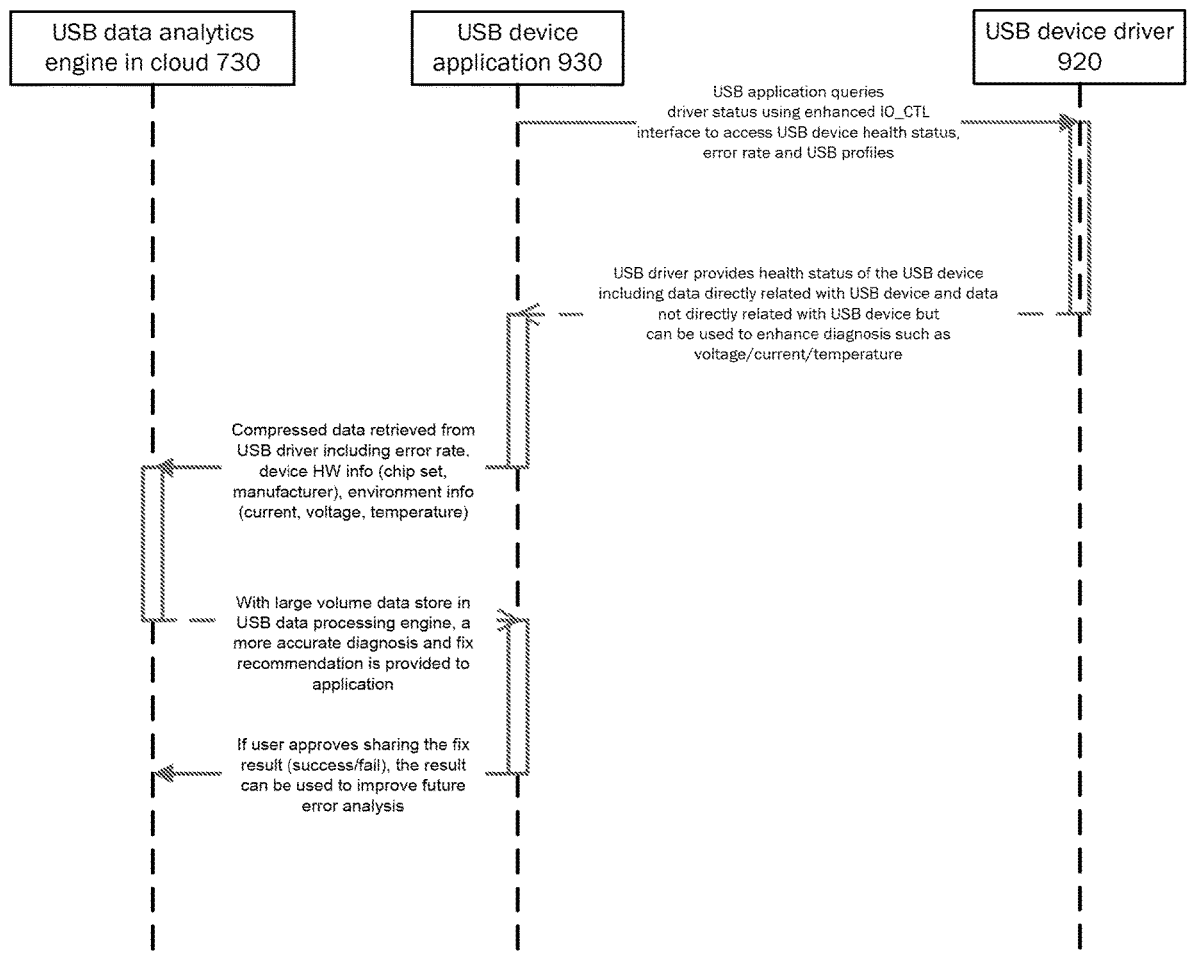
FIG. 10 is a diagram illustrating an example of a cloud-based analytic engine.

FIGS. 9 and 10 illustrate another example of using a cloud-based USB data analytics engine 730 configured to generate predictions of USB device performance and/or failure based upon various data sources. The device may add information from the cloud-based analytic engine analysis to its local knowledge base for future reference and use. In one embodiment, data set be sent to a USB data analytic engine 730 via a cloud 950. The USB data analytic engine 730 may utilize not only historic telemetry data, but also data from the manufacturer of applicable chipsets to provide better predictions on the future failure rate of the USB device. The USB data analytic engine 730 can also provide suggestions to the user, such as if/when the user should have a backup device to avoid data loss and device interruptions. In one embodiment, a USB device 900 may connect to computer 940. The computer 940 may have a USB driver 920 that has enhanced functionality to track and monitor USB transactions as described herein. The USB driver 920 may be configured to detect an error and report the error to USB device application 930. The USB device application 930 may generate an inquiry on a device interface, requesting an input from the user as to whether the user 910 would like to communicate with the USB data analytic engine 730 via a cloud 950 to perform an issue diagnosis of the detected error. In response to acknowledgement from the user 910, the USB device application 930 may query the USB device driver 920 regarding the error. The device application 930 may detect the issue and the USB device application 930 may send requests with error information retrieved from the USB driver 920 to USB data analytic engine 730 via a cloud 950. USB data analytic engine 730 may generate a recommendation based on the received data. The USB data analytic engine 730 may send the recommendation to the USB device application 930 for action by the application, such as providing an alert to the user 910. FIG. 10 illustrates dataflows between USB data analytic engine 730, USB device application 930, and USB driver 920. As shown, the USB device application 930 may query driver status using an enhanced IO_CTL interface to obtain USB device health status, error rate, and USB profiles from USB driver 920. USB driver 920 may provide health status of the USB driver 920 including data directly related with USB device 900 and data not directly related with USB device 900 such as voltage, current, and temperature. USB device application 930 may send compressed data retrieved from USB driver 920 including error rate, device hardware information (e.g., chip set, manufacturer), and environment information (e.g., current, voltage, temperature). USB data analytic engine 730 may use the data to generate an error failure prediction and recommendation that may be provided to prevent a USB device usage interruption. If the user approves sharing the result (success/fail), the result can be used to improve future error analysis.

Figure 11:
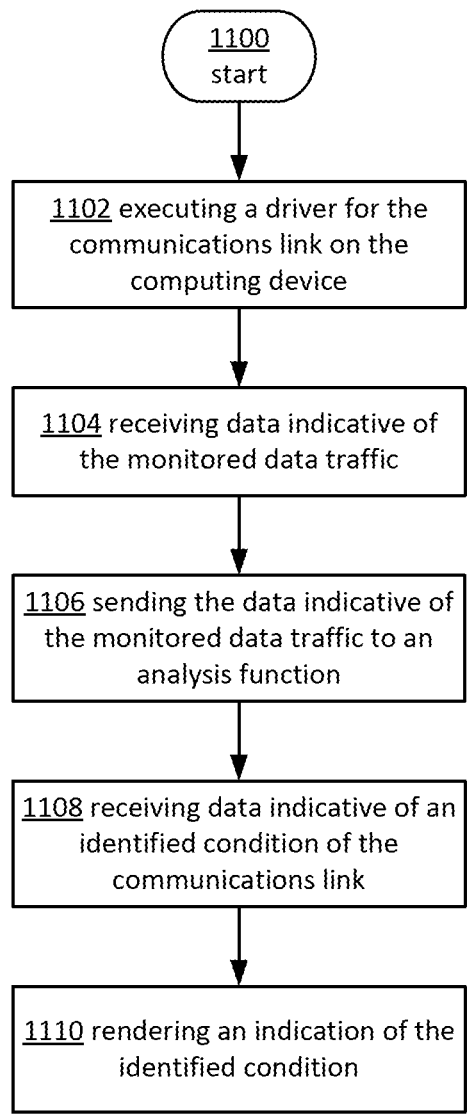
FIG. 11 is a flowchart depicting an example procedure for monitoring a communications link between a computing device and an external device in accordance with the present disclosure.

FIG. 11 illustrates an example operational procedure for monitoring a communications link between a computing device and an external device. Referring to FIG. 11, operation 1100 begins the operational procedure. Operation 1100 may be followed by operation 1102. Operation 1102 illustrates executing a driver for the communications link on the computing device. In an embodiment, the driver may be configured to monitor data traffic over the communications link.

Operation 1102 may be followed by operation 1104. Operation 1104 illustrates receiving, from the driver, data indicative of the monitored data traffic. Operation 1104 may be followed by operation 1106. Operation 1106 illustrates sending the data indicative of the monitored data traffic to an analysis function. In an embodiment, the analysis function may be configured to identify a condition of the communications link based at least in part on accumulated data indicative of the data traffic. Operation 1106 may be followed by operation 1108. Operation 1108 illustrates receiving, from the analysis function, data indicative of an identified condition of the communications link.

Operation 1108 may be followed by operation 1110. Operation 1110 illustrates rendering, on a display device of the computing device, an indication of the identified condition. In some embodiments, the indication of the identified condition may include an error condition or a predicted failure associated with the communications link. The predicted failure or error condition may be determined based on a failure prediction model, which may incorporate a Naive Bayes classifier in some embodiments. Other embodiments may incorporate other probabilistic pattern matching functions as described herein. Universal Serial Bus (USB) is one example of a communications link. The data indicative of the data traffic may be sent to an off-device service via a communications network. The off-device service may include an analysis function or engine. In some embodiments, the analysis function or engine may be trained using a machine learning function. The analysis function or engine may incorporate a probabilistic classifier such as a Naive Bayes classifier. In some embodiments, the analysis function or engine may be locally implemented.

Figure 12:
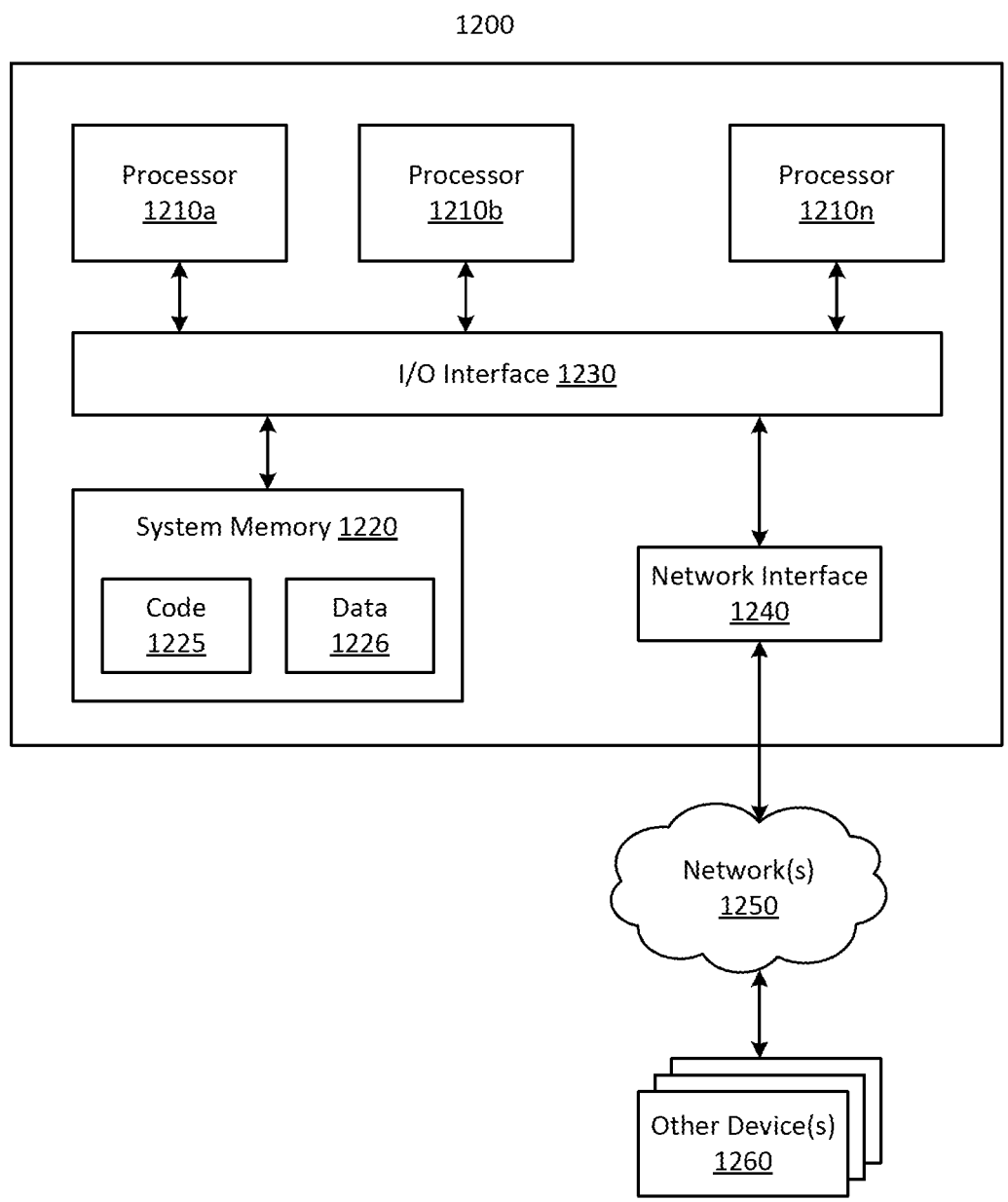
FIG. 12 is an example computer system that may be used in some embodiments.

In at least some embodiments, a computing device that implements a portion or all of one or more of the technologies described herein, including the techniques to implement the functionality of an analytics engine 1200 may include a general-purpose computer system that includes or is configured to access one or more computer-accessible media. FIG. 12 illustrates such a general-purpose computing device 1200. In the illustrated embodiment, computing device 1200 includes one or more processors 1210a, 1210b, and/or 1210n (which may be referred herein singularly as "a processor 1210" or in the plural as "the processors 1210") coupled to a system memory 1220 via an input/output (I/O) interface 1230. Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing, or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other device or devices 1260 attached to a network or network(s) 1250, such as other computer systems or devices as illustrated in FIGS. 1 through 11, for example. In various embodiments, network interface 1240 may support communication via any suitable wired or wireless general data networks, such as types of Ethernet networks, for example. Additionally, network interface 1240 may support communication via telecommunications/telephony networks such as analog voice networks or digital fiber communications networks, via storage area networks such as Fibre Channel SANs or via any other suitable type of network and/or protocol.

In some embodiments, system memory 1220 may be one embodiment of a computer-accessible medium configured to store program instructions and data as described above for FIGS. 1-11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic or digital signals, conveyed via a communication medium such as a network and/or a wireless link, such as may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A network set up by an entity, such as a company or manufacturer, to provide one or more services (such as various types of cloud-based analytics services) accessible via the Internet and/or other networks to a distributed set of clients may be termed a service provider. Such a provider network may include numerous data centers hosting various resource pools, such as collections of physical and/or virtualized computer servers, storage devices, networking equipment, and the like, needed to implement and distribute the infrastructure and services offered by the service provider.

A number of different types of computing devices may be used singly or in combination to implement the resources of the service provider in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing device comprising:
at least one processor; and
at least one memory in communication with the at least one processor, the at least one memory having stored thereon computer readable instructions that, when executed by the computing device, cause the computing device to at least:
execute a driver for a communications link between the computing device and an external device, wherein the driver is configured to collect error information generated on the communications link comprising counts of handshake packets, wherein each of the handshake packets is associated with one of a plurality of handshake values, wherein the driver includes a counter associated with each of the plurality of handshake values, and wherein the driver collects error information by incrementing a counter that corresponds to a handshake value of a received handshake packet;
receive, from the driver, the counts of handshake packets;
send the counts of handshake packets to an analytics engine configured to identify a condition of the communications link based at least in part on the counts of handshake packets and historical counts of handshake packets;
receive, from the analytics engine, data indicative of an identified condition of the communications link; and
in response to receiving the data indicative of the identified condition of the communications link, render, on a display device of the computing device, an indication of the identified condition.

2. The computing device according to claim 1, wherein the data indicative of an identified condition comprises a predicted cause of a failure associated with the communications link.

3. The computing device according to claim 2, wherein the predicted cause of a failure is determined based on a failure prediction model.

4. The computing device according to claim 3, wherein the failure prediction model is based on a Naive Bayes classifier.

5. The computing device according to claim 1, wherein the communications link is Universal Serial Bus (USB), and wherein the handshake packets comprise an ACK packet, a NAK packet, a STALL packet, and a NYET packet.

6. The computing device according to claim 1, further comprising computer readable instructions that, when executed by the computing device, cause the computing device to at least send the data indicative of the data traffic to an off-device service via a communications network.

7. A method for monitoring a communications link between a computing device and an external device, the method comprising:
executing a driver for the communications link on the computing device, wherein the driver is configured to collect error information generated on the communications link comprising counts of handshake packets, wherein each of the handshake packets is associated with one of a plurality of handshake values, wherein the driver includes a counter associated with each of the plurality of handshake values, and wherein the driver collects error information by incrementing a counter that corresponds to a handshake value of a received handshake packet;

receiving, from the driver, the counts of handshake packets;

sending the counts of handshake packets to an analysis function configured to identify a condition of the communications link based at least in part on counts of handshake packets and accumulated counts of handshake packets of the data traffic;

receiving, from the analysis function, data indicative of an identified condition of the communications link; and rendering, on a display device of the computing device, an indication of the identified condition.

8. The method of claim 7, wherein the identified condition is an error condition of the communications link.

9. The method of claim 7, further comprising receiving, from the analysis function, data indicative of a recommended remedial action associated with the identified condition of the communications link.

10. The method of claim 7, wherein the analysis function is trained using a machine learning function.

11. The method of claim 7, wherein the analysis function comprises a probabilistic classifier.

12. The method of claim 7, further comprising sending the counts of handshake packets to an off-device service via a communications network.

13. The method of claim 12, wherein the off-device service is configured to receive counts of handshake packets from a plurality of computing devices.

14. The method of claim 13, wherein the off-device service is configured to analyze the counts of handshake packets from the plurality of computing devices to identify the condition based on a probabilistic pattern matching function.

15. The method of claim 14, wherein the accumulated data comprises one or more handshake packets for a Universal Serial Bus (USB) protocol.

16. The method of claim 14, wherein the counts of handshake packets are counted in one or more counters implemented as 64 bit counters.

17. A computer-readable storage medium having stored thereon computer readable instructions for a driver for a Universal Serial Bus (USB) communications link on a computing device, the computer-readable instructions comprising instructions that upon execution on a computing device, at least cause:

monitoring USB data traffic over the USB communications link, the USB data traffic comprising handshake packets;

accumulating error information generated on the communications link comprising counts of handshake values, wherein each of the handshake packets is associated with one of a plurality of handshake values, wherein the driver includes a counter associated with each of the plurality of handshake values, and wherein the driver counts handshake values by incrementing a counter that corresponds to a handshake value of a received handshake packet;

receiving, via a programming interface, first electronic messages that encode identifiers indicative of requests for the accumulated counts of handshake values of the monitored USB data traffic; and in response to receiving one of the first electronic messages, sending, via the programming interface, second electronic messages indicative of the accumulated counts of handshake values of the monitored USB data traffic.

18. The computer-readable medium of claim 17, further comprising computer-readable instructions comprising instructions that upon execution on the computing device, at least cause:

receiving a third electronic message that encodes a command to clear the accumulated data; and in response to receiving the third electronic message, clearing the counters associated with each of the plurality of handshake values of the monitored USB data traffic.

19. The computing device according to claim 1, additionally causing the computing device to:

send voltage, current, temperature, temperature changes, vibration, or noise information to the analytics engine, wherein the data indicative of the identified condition of the communications link is based in part on the sent information.

* * * * *